United States Patent [19]

Falconer

[11] Patent Number: 4,479,092

[45] Date of Patent: Oct. 23, 1984

[54] DIGITAL FREQUENCY-SHIFT KEYED DEMODULATOR

[75] Inventor: David D. Falconer, Nepean, Canada

[73] Assignee: AT&T Bell Laboratories, Murray Hill, N.J.

[21] Appl. No.: 323,462

[22] Filed: Nov. 20, 1981

[51] Int. Cl.$^3$ .............................................. H03D 3/18
[52] U.S. Cl. .................................... 329/145; 329/107; 329/50; 375/82; 375/94
[58] Field of Search ................. 329/50, 107, 126, 129, 329/145; 370/110.3; 375/45, 46, 47, 79, 82, 88, 94

[56] References Cited

U.S. PATENT DOCUMENTS

| | | | |
|---|---|---|---|
| 4,064,361 | 12/1977 | Kustka et al. | 329/145 X |
| 4,368,434 | 1/1983 | Miller et al. | 329/50 |
| 4,388,595 | 6/1983 | Brooks | 329/126 |
| 4,412,339 | 10/1983 | Alfke et al. | 375/82 |

FOREIGN PATENT DOCUMENTS 2050706 10/1970 Fed. Rep. of Germany ...... 329/126

Primary Examiner—Eugene R. LaRoche
Assistant Examiner—W. R. Paxman
Attorney, Agent, or Firm—Thomas Stafford

[57] ABSTRACT

Asynchronous digital frequency shift keyed (FSK) signals are demodulated by using an autocorrelation type demodulator including digital integration. To this end, the autocorrelation function and digital integration are realized by generating integration increments, i.e., area increments, at the digital signal sampling points and accumulating them to obtain the integrated output. This is realized by turning to account a relationship between zero crossings of the received signal, zero crossings of a delayed version of the received signal and polarity of the product of the received signal and its delayed version relative to sampling points of the received digital signal. Specifically, the area increment in an $n^{th}$ sampling interval is determined by the time interval since the last zero crossing of the received signal before the $n^{th}$ sampling point, the time interval since the last zero crossing of the delayed signal before the $n^{th}$ sampling point and the polarity of the product signal at the $n^{th}$ sampling point.

6 Claims, 7 Drawing Figures

LOGIC FOR DETERMINING u(n)

DEMODULATOR OUTPUT

LOGIC FOR DETERMINING v(n) AND SGN [s(nT-τ)]

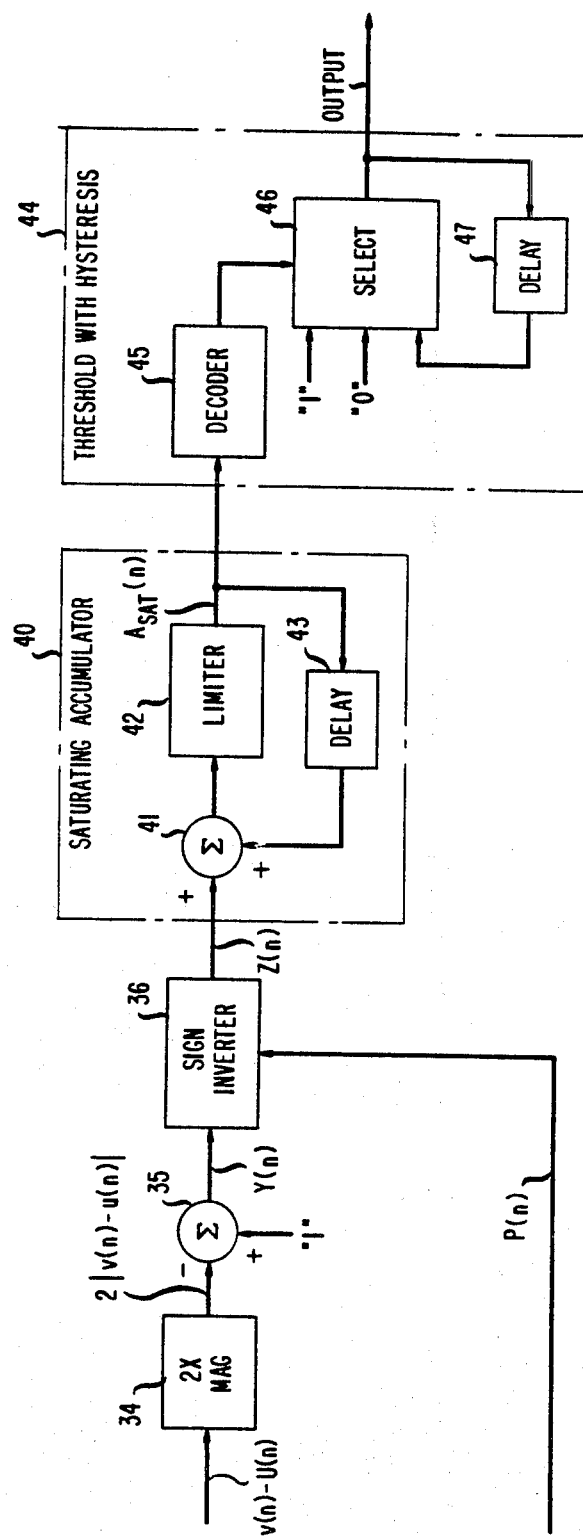

DIGITAL FREQUENCY-SHIFT KEYED DEMODULATOR

TECHNICAL FIELD

This invention relates to demodulation of frequency-shift keyed message-data signals.

BACKGROUND OF THE INVENTION

In data transmission systems, data is often transmitted to a remote location by transmitting frequency-shift keyed (FSK) signals over a telephone line. An FSK signal received at the remote location is demodulated to recover the original data signal. To this end, a number of digital FSK demodulators have been proposed. The prior known FSK demodulators are designed to process analog line signals. Thus, if such FSK demodulators were to be used in a terminal with digitized line signals, for example, a $\mu$-law PCM signal, the individual line signals to be demodulated would require digital-to-analog conversion before demodulation. Additionally, digital multipliers would be required which are complex and, therefore, undesirable.

SUMMARY OF THE INVENTION

These and other problems are overcome in the demodulation of frequency-shift keyed message-data signals in a received digital signal by employing an autocorrelation type demodulator using digital integration. Digital integration increments, i.e., area increments, are generated in accordance with an aspect of the invention by turning to account a relationship between zero crossings of the received signal, zero crossings of a delayed version of the received signal and polarity of the product of the received digital signal and delayed version relative to sampling points of the received signal. Specifically, the area increment in an $n^{th}$ sampling interval is determined by the time interval since the last zero crossing of the received signal before the $n^{th}$ sampling point, the time interval since the last zero crossing of the delayed signal before the $n^{th}$ sampling point and the polarity of the product signal at the $n^{th}$ sampling point. The area increments are accumulated by a saturating accumulator and compared to threshold values including hysteresis to generate signals representative of mark and space at the digital signal sampling rate.

BRIEF DESCRIPTION OF THE DRAWING

The invention will be more fully understood from the following theoretical discussion and circuit description of an illustrative embodiment thereof taken in connection with the drawing including the appended figures, in which:

FIGS. 6 and 7 when combined as shown in FIG. 8 show in simplified block diagram form a FSK demodulator including an embodiment of the invention.

THEORETICAL DISCUSSION

In an autocorrelation type FSK demodulator signals representative of the message-data, i.e., mark and space, are generated by multiplying a received signal with a delayed version of the received signal to generate a product signal, integrating the product signal and comparing the integrated product signal to a threshold value including hysteresis. In this example, the delay is $\tau$ where $$\tau = \frac{2k+1}{2(fH + fL)} \qquad (1)$$

where $k = 0, 1, \ldots$, fH is the mark frequency of, for example 1270 Hz,
fL is the space frequency of, for example 1070 Hz, and
k is selected to be, for example, 5. In general, $\tau$ is of the form $\tau = (L+f)T$ where T is the sampling interval, L is an integer and f is between 0 and 1.

Figures 1, 2:
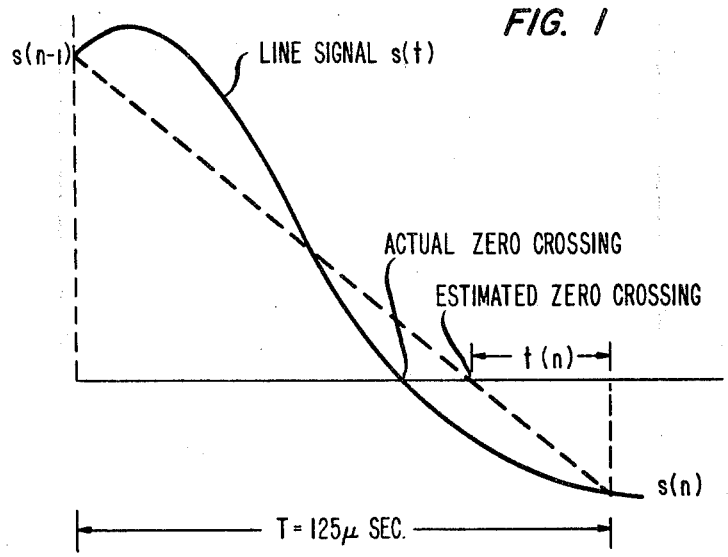
FIG. 1 is a graphical representation of estimating zero crossing locations employing linear interpolation between signal samples.
FIG. 2 is a graphical representation of a sequence of waveforms useful in describing the invention.

As indicated above, the desired integration is realized in accordance with an aspect of the invention by turning to account a unique relationship between zero crossings of the received signal and delayed signal relative to the sampling points. Accordingly, the zero crossings of the received signal and its delayed version must be obtained. This is realized by linear interpolation between magnitudes of successive signal samples, s(n$-$1) and s(n), as illustrated in FIG. 1. The time t(n) from the estimated zero crossing to the time of occurrence of sample s(n) shown in the FIG. 1 is given by t(n)=Tx(n) where $$x(n) = \frac{|s(n)|}{|s(n)| + |s(n-1)|} \qquad (2)$$

where in this example
T = 1/8000 = 125 $\mu$sec,
s(n) is the $n^{th}$ sample and
s(n$-$1) is the (n$-$1)$^{th}$ sample.

Digital integration is realized in accordance with an aspect of the invention by accumulating increments in area of the product signal over sampling intervals T as illustrated in FIG. 2. As shown in FIG. 2, the area increment Z(n) (integration increment) in the $n^{th}$ sampling interval is determined entirely by x(n), the estimated quantized normalized time since the last zero crossing of received signal s(t) before the $n^{th}$ sample, by x(n)', the time since the last zero crossing of the delayed signal s(t$-\tau$), and by the polarity of product signal s(nT)s(nT$-\tau$). The received signal sampling points, i.e., sampling instances, are shown in FIG. 2 as n$-$1, n, n+1, etc. The magnitude of the area increment at the $n^{th}$ sampling, i.e., sampling instant is $$Z(n) = Y(n)P(n) \qquad (3)$$

where $$Y(n) = \begin{vmatrix} 1 & \text{if } x(n) \text{ and } x(n)' \geq 1 \\ 2x(n) - 1 & \text{if } 0 \leq x(n) < 1 \leq x(n)' \\ 2x(n)' - 1 & \text{if } 0 \leq x(n)' < 1 \leq x(n) \\ 2[x(n) - x(n)'] + 1 & \text{if } 0 \leq x(n) \leq x(n)' < 1 \\ 2[x(n)' - x(n)] + 1 & \text{if } 0 \leq x(n)' \leq x(n) < 1 \end{vmatrix} \qquad (4)$$

$$Y(n) = 1 - 2|v(n) - u(n)|$$

where $$u(n)=\min|1,x(n)| \text{ and } v(n)=\min|1,x(n)'|$$

and $$P(n)=SGN[s(nT)s(nT-\tau)]. \quad (5)$$

Figure 3:
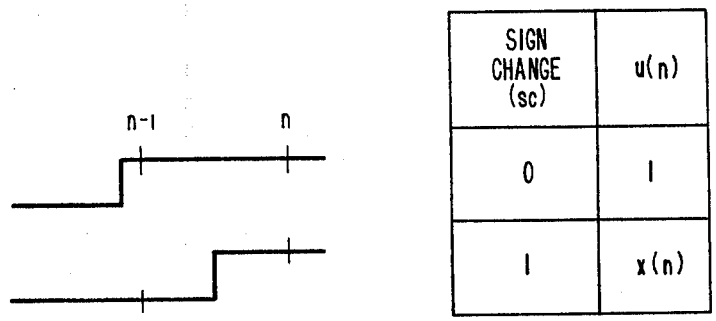
FIG. 3 is a table showing logic for generation of u(n)

The value $u(n)=x(n)$ is obtained from (2) if a zero crossing, evidenced by a sign (polarity) change between $s((n-1)T)$ and $s(nT)$, was detected. If no zero crossing was detected, then $x(n)$ exceeds 1 and $u(n)$ is set to 1. The quantity $u(n)$ is formed by selecting $x(n)$ or 1, according to the prescribed logic criteria of the table shown in FIG. 3.

Figure 4:
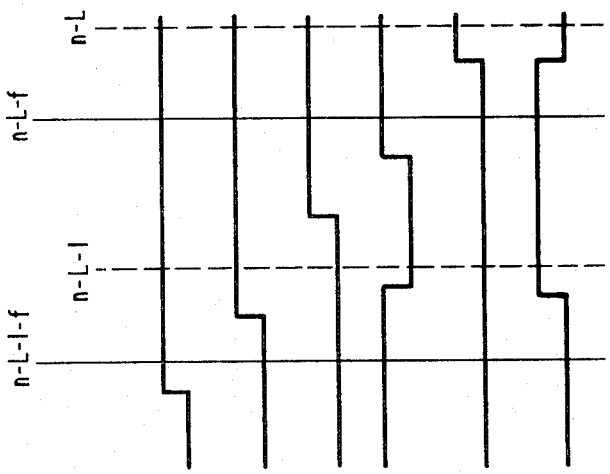
FIG. 4 is a table showing logic for generation of v(n) and SGN[s(nT$-\tau$)]

The value of $x(n)'$ as the time since the last zero crossing of the delayed signal $s(t-\tau)$ signifies that a zero crossing occurred $x(n)'+\tau/T$ time units in the past. If the ratio $\tau/T$ were an integer, L, then $x(n)'$ can be derived exactly as $x(n)$ is derived, employing a L-sample delay of the received sample. In this example, $L=10$. However, in general, $\tau/T$ will be of the form $L+f$, where $0<f<1$. In this situation, the extra fractional delay f must be subtracted from equation (2) to form $x(n)'$. Specifically, if a sign change from $s[(n-L-1)T]$ to $s[(n-L)T]$ is detected, a representation of $x(n-L)-f$ is generated which may be positive or negative. If the result is negative, it means that the zero crossing actually occurs in the next sampling interval of the (L+f)-delayed signal. In this situation, the result $x(n-L-1)-f$ is stored and then augmented by 1, forming $x(n-L-1)-f+1$. Selection of $x(n-L)-f$, $x(n-L-1)-f+1$ or 1 to form the quantity $v(n)$ is made according to the prescribed logic criteria of the table shown in FIG. 4.

The demodulator accumulates the area increments $Z(n)$, i.e., integrates the product signal to generate area $A(n)$, as follows, $$A(n)=A_{SAT}(n-1)+Z(n)$$

$$A_{SAT}(n)=A(n) \text{ if } |A(n)|\leq H$$

$$A_{SAT}(n)=H \text{ if } A(n)>H$$

$$A_{SAT}(n)=-H \text{ if } A(n)<-H. \quad (6)$$

Figure 5:
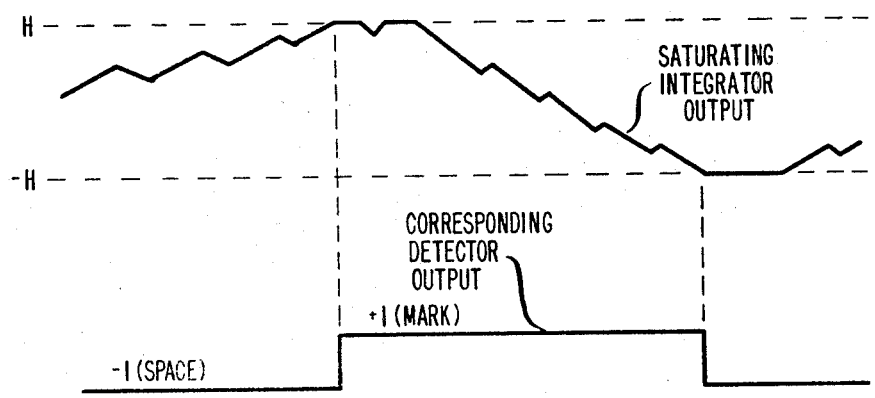
FIG. 5 is a graphical representation of the mark and space output of the demodulator.

The quantity H is a fixed positive saturating value and threshold. As illustrated in FIG. 5, the demodulator's output is Mark (positive) after $A(n)$ exceeds H and remains so until $A(n)$ first crosses the $-H$ threhold, at which time the output is Space (negative) until the next time $A(n)$ crosses $+H$. Thus, the estimated zero crossings of the data waveform coincide with crossings by $A(n)$ of thresholds $\pm H$.

CIRCUIT DESCRIPTION

Figure 6:
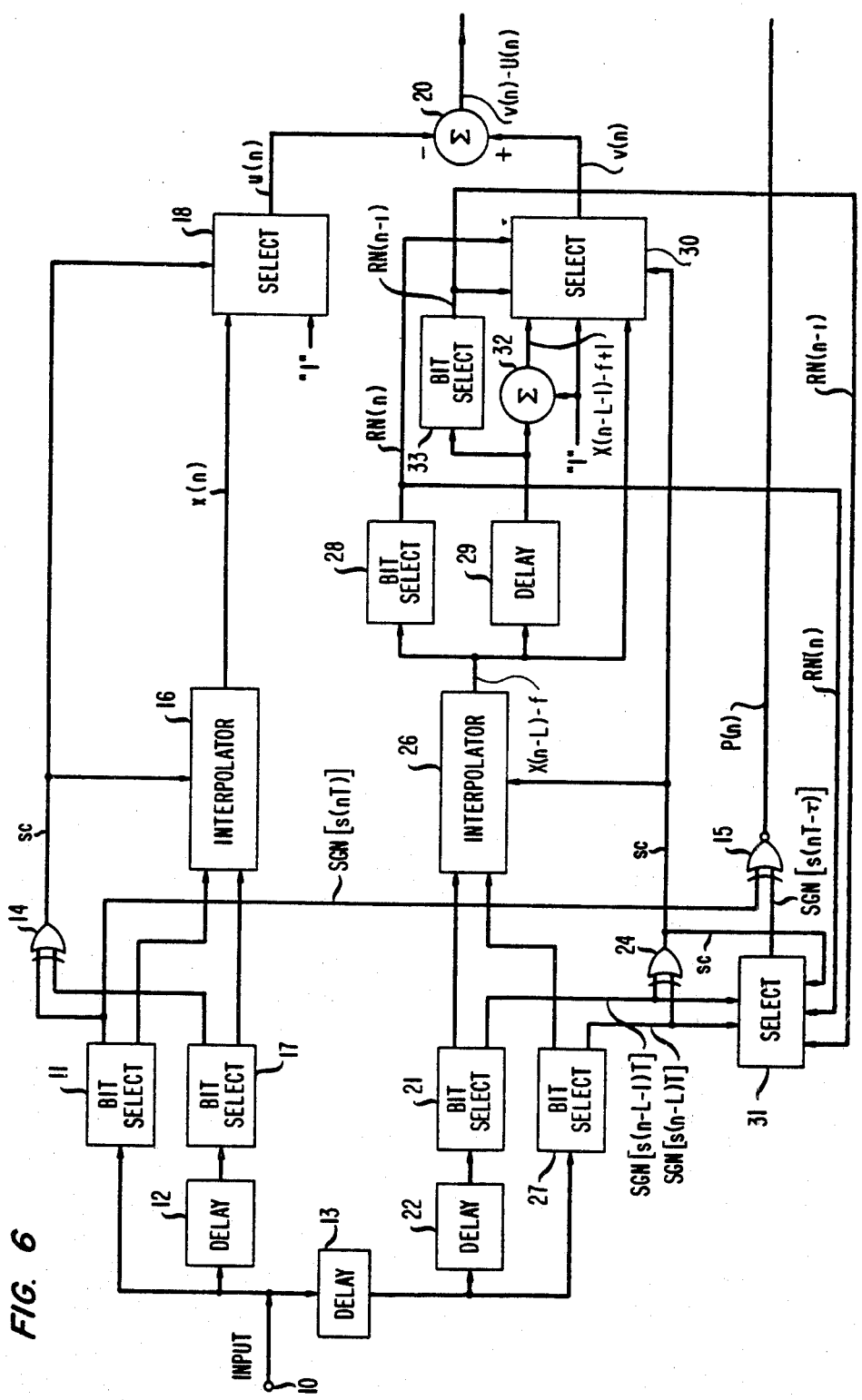

FIG. 6 shows in simplified block diagram form a digital asynchronous FSK demodulator incorporating the present invention. The demodulator is intended for use with low data rate voice band message-data signals, for example, 300-baud. For simplicity and clarity of description timing signals have not been included, since use of such signals will be apparent to those skilled in the art.

The FSK demodulator shown in FIG. 6 is of the autocorrelation type in which digital signal $s(t)$ including samples $s(nT)$ representative of incoming mark and space frequencies used to transmit the message-data is supplied to input terminal 10. In practice, an input filter and limiter (not shown) may be employed in well known fashion. If the digital signal is $\mu$-law, a converter (not shown) may be employed to generate a linear digital signal. In this example, 6 bit quantized samples including a sign bit and 5 magnitude bits are employed in $s(nT)$ which are transmitted in parallel in the demodulator. In this example, the sampling rate is 8000 bits/second and T is 125 microseconds.

Accordingly, signal samples $s(nT)$ of the mark and space frequencies are supplied via terminal 10 to bit select 11, delay 12 and delay 13. Bit select 11 is employed to supply the sign bit of $s(nT)$ samples to a first input of Exclusive OR gates 14 and 15 and the 5 magnitude bits to an address input of interpolator 16. An appropriate gating circuit may be used for this purpose. Delay 12 is employed to delay $s(nT)$ one sampling interval T to obtain $s[(n-1)T]$. Delay 12 may be a plurality of flip-flops or a shift register to realize the desired delay interval in well known fashion. Delayed samples $s[(n-1)T]$ are supplied to bit select 17 which controllably supplies the sign bit of $s[(n-1)T]$ samples to a second input of Exclusive OR gate 14 and the 5 magnitude bits of samples $s[(n-1)T]$ to an address input of interpolator 16. Exclusive OR gate 14 operates as a sign (polarity) change (SC) detector between the presently received sample $s(nT)$ and the last previously received sample $s[(n-1)T]$. Output SC from Exclusive OR gate 14 is supplied to controllably enable interpolator 16 and signal select 18 when a change in sign and, hence, a zero crossing has occurred between successive signal samples. Interpolator 16 generates interval estimate $x(n)$ to the zero crossing by simple interpolation between the amplitudes of the signal samples as described above and shown in FIG. 1. Interpolator 16 may be, for example, a read only memory (ROM) having signals stored in memory locations representative of values for $x(n)$ relative to the magnitudes of $s(n)$ and $s(n-1)$. The appropriate memory location for generating $x(n)$ is addressed by the 10 magnitude bits of $s(n)$ and $s(n-1)$ and an output signal representative of $x(n)$ is generated when a sign change (SC) between $s(n)$ and $s(n-1)$ is detected via Exclusive OR gate 14. Signal $x(n)$ includes 8 parallel bits which are supplied to a first input of select logic 18. Select logic 18 is used to generate output signal $u(n)$. To this end, a signal representative of one (1) is supplied to a second input of select logic 18. Signal $u(n)$ is generated in response to states of sign change signal SC from Exclusive OR gate 14 in accordance with the prescribed logic criteria of the table shown in FIG. 3 discussed above. Thus, $u(n)$ is selected to be $x(n)$ when there is a sign change represented by a logical 1SC signal and one (1) when there is no sign change represented by a logical 0SC signal. Signal $u(n)$ is supplied to a negative input of summing circuit 20.

As indicated above, received signal samples $s(nT)$ are also supplied via delay 13 to generate signal samples $s[(n-L)T]$ which are supplied to bit select 21 and delay 22. Delay 13 may be a plurality of flip-flops or a shift register for realizing delay LT. Indeed, bit select 21, delay 22, Exclusive OR gate 24, interpolator 26 and bit select 27 perform functions essentially identical to bit select 11, delay 12, Exclusive OR gate 14, interpolator 16 and bit select 17, respectively. A difference is that appropriate signal representations are stored in a ROM in interpolator 26 to generate an 8-bit output signal representation of $x(n-L)-f$ upon detection of a zero crossing, i.e., sign (polarity) change SC, from signal sample $s[(n-L-1)T]$ to $s[(n-L)T]$. This output signal from interpolator 26 may be postive or negative and is supplied to bit select 28, delay 29 and select logic 30. Bit select 28 supplies the sign (polarity) bit, namely, RN(n), of the output from interpolator 26 to select logic 30 and select logic 31. Delay 29 is employed to store the output from interpolator 26 for one sampling interval. The output from delay 29 is supplied to summing circuit 32 and to bit select 33 which, in turn, supplies the sign (polarity) bit, namely, RN(n−1) of the stored signal to select logic 30 and select logic 31. Summing circuit 32 algebraically combines the delayed output from interpolator 26 and one (1) to generate x(n−L−1)−f+1. Select logic 30 controllably supplies either x(n−L)−f, x(n−L−1)−f+1 or 1 to generate v(n) in accordance with the prescribed logic criteria of the table shown in FIG. 4. Signal v(n) is supplied to a positive input of summing circuit 20.

Summing circuit 20 algebraically combines v(n) and u(n) to generate (v(n)−u(n)) in well known fashion which, in turn, is supplied to 2×MAG unit 34 which is a summing circuit for modifying the magnitude of (v(n)−u(n)) to generate $2|v(n)-u(n)|$. A signal representing $2|v(n)-u(n)|$ is supplied to a negative input of summing circuit 35 while a signal representative of one (1) is supplied to a positive input to algebraically combine the signals to generate $Y(n)=1-2|v(n)-u(n)|$. A signal representative of Y(n) is supplied to sign inverter 36 for generating the area increment, Z(n), i.e., integration increment for the $n^{th}$ sampling interval. Sign inverter 36 is responsive to the sign of the product signal P(n) for generating Z(n) in accordance with Y(n) of equation 4 with the sign of P(n) of equation 5.

The sign of product signal P(n) is generated by supplying the sign (polarity) bit of sample s(nT) and sign (polarity) bit of s(nT−τ) to Exclusive NOR gate 15 which operates to generate a logical 1 when the sign of P(n) is negative. In turn, the logical 1 P(n) signal causes sign inverter 36 to invert the sign of Y(n). A logical 0 P(n) signal causes no inversion of the sign of Y(n). Sign (polarity) bit SGN(nT−τ) of s(nT−τ) is generated by supplying the sign bits of s(nT−L) and s(nT−L−1) to select logic 31 which is enabled in response to sign (polarity) change signal SC from Exclusive OR gate 24, sign (polarity) bit RN(n) and sign (polarity) bit RN(n−1) to generate SGN[s(nT−τ)] in accordance with the prescribed logic criteria shown in the table of FIG. 4.

Area increment Z(n) is supplied to saturating accumulator 40 including summing circuit 41, 8 bit limiter 42 and delay 43. Saturating accumulator 40 operates in well known fashion to generate $A_{SAT}(n)$ as described above. $A_{SAT}(n)$ is supplied to threshold comparator 44 including hysteresis to generate a signal representative of mark (positive) and space (negative) of the received message-data in accordance with equation 6 discussed above and shown in FIG. 5. Threshold comparator 44 includes decoder 45 which generates a 2 bit word in response to the 8 bit $A_{SAT}(n)$ signal. The 2 bit word output from decoder 45 is used to control select logic 46 to generate a logical 1 or 0 output depending on the presently generated output fedback via delay 47. Thus, the output from select 46 and, hence, the FSK demodulator output is either a logical 1 (mark) or logical 0 (space) at an 8000 bit/second rate.

Time sharing of the demodulator over N input time-division multiplexed trunks is readily realized by multiplying the 8000 bit/second rate by N and employing N-word shift registers for delay units 12, 13, 22, 29, 43 and 47.

What is claimed is:

1. An autocorrelation frequency-shift keyed (FSK) demodulator for demodulating a received digital FSK signal by sampling the received signal at periodic sampling points to generate a sampled signal including
   means for delaying the sampled signal to generate a delayed sample signal,
   means for generating a product signal representing the product of the sampled signal and the delayed sampled signal,
   means for integrating the product signal to generate an integrated signal, and
   means for comparing the integrated signal to predetermined threshold values to obtain a demodulated FSK signal, said demodulator being characterized by,
   means for generating a representation of a first interval since a zero crossing of the received signal to a subsequent sampling point of the received signal,
   means for generating a representation of a second interval since a zero crossing of the delayed sampled signal to said subsequent sampling point,
   means for generating a representation of the polarity of said product at said subsequent sampling point, and
   means supplied with said first interval representation, said second interval representation and said polarity representation for generating a representation of an integration area increment for the period between said periodic sampling points which is terminated by said subsequent sampling point, said integration area increment representing said integrated signal.

2. The demodulator as defined in claim 1 wherein each sampled signal and delayed sampled signal includes a sign bit and a plurality of magnitude bits, and wherein said first interval representation generating means includes
   means supplied with said sampled signal sign bits for generating a first polarity change signal representative of a polarity change between successive samples of the sampled signal and
   means supplied with said magnitude bits of said successive samples of the sampled signal and being responsive to said first polarity change signal for generating said first interval representation, and wherein said second interval representation generating means includes
   means supplied with said delayed sampled signal sign bits for generating a second polarity change signal representative of a polarity change between successive samples of the delayed sampled, signal and
   means supplied with said magnitude bits of said successive samples of the delayed sampled signal and being responsive to said second polarity change signal for generating said second interval representation.

3. The demodulator as defined in claim 2 wherein said integration area increment generating means includes
   means for controllably selecting as a first output representation said first interval representation when said first polarity change signal indicates a change in polarity between successive samples of said sampled signal or a predetermined value representation when said first polarity change signal indicates no change in polarity between successive samples of said sampled signal, means for controllably selecting as a second output representation said second interval representation when said second polarity change signal indicates a change in polarity between successive samples of said delayed sampled signal or a predetermined value representation when said second polarity change signal indicates no change in polarity between successive samples of said delayed sampled signal, means for algebraically combining said first output representation and said second output representation, means for modifying a magnitude of said algebraically combined first and second output representations, means for algebraically combining said modified magnitude with a predetermined value to generate a third output representation, and means responsive to said polarity representation for controllably inverting the polarity of said third output representation when said polarity representation indicates a change in polarity of said product signal, said third output representation being said integration area increment.

4. The demodulator as defined in claim 3 wherein said second interval reresentation generating means includes means for generating a first signal representative of a third interval from said sampling point to a zero crossing of the delayed sampled signal, means for generating a signal representative of the polarity of said first signal, means for storing said first signal for a predetermined interval, means for generating a signal representative of the polarity of said stored first signal, and means for adding a predetermined value representation to said stored first signal for generating a second signal representative of a fourth interval from said sampling point to a zero crossing occurring in a subsequent sampling interval of said delayed sampled signal, wherein said second output representation selecting means is supplied with said first signal, said second signal and a representation of a predetermined value and is responsive to said second polarity change signal, said first signal polarity signal and said stored first signal polarity signal for selecting as said second output representation, said first signal when said second polarity change signal indicates a change in polarity between successive samples of said delayed sampled signal and when said first signal polarity signal and said stored first signal polarity signal both indicate no change in polarity, said second signal when said said stored first signal polarity signal indicates a change in polarity and both said second polarity change signal and said first signal polarity signal either indicate no change in polarity or a change in polarity, or said predetermined value representation when said second polarity change signal, said first signal polarity signal and said stored first signal polarity signal all indicate no change in polarity or when said second polarity change signal and said stored first signal polarity signal both indicate a change in polarity and said first signal polarity signal indicates no change in polarity or when said second polarity change signal and said first signal polarity signal both indicate a change in polarity and said stored first signal polarity signal indicates no change in polarity.

5. The demodulator as defined in claim 4 further including means for accumulating integration area increments generated for successive sampling intervals and for supplying a value of said accumulated area increments to said comparing means.

6. The demodulator as defined in claim 4 wherein said polarity representation generating means includes means supplied with said second polarity change signal, said first signal polarity signal and said stored first signal polarity signal for selecting as an output representative of the delayed sampled signal polarity either the polarity of the present sample of the delayed sampled signal when said second polarity change signal, said first signal polarity signal and said stored first signal polarity signal all indicate no change in polarity or when said second polarity change signal and said first signal polarity signal indicate no change in polarity and said stored first signal polarity signal indicates a change in polarity or when said second polarity change signal and said first signal polarity signal indicate no change in polarity and said stored first signal polarity signal indicates a change in polarity or when said second polarity change signal and said stored first signal polarity signal both indicate a change in polarity and said first signal polarity signal indicates no change in polarity, or the polarity of the last previous sample of the delayed sampled signal when said second polarity change signal and said first signal polarity signal both indicate a change in polarity and said stored first signal polarity signal indicates no change in polarity or when said second polarity change signal, said first signal polarity signal and said stored first signal polarity signal all indicate a change in polarity, and means responsive to a signal representative of the polarity of the present sample of the sampled signal and said output representative of the delayed sampled signal polarity for generating said polarity representation in accordance with an Exclusive OR function.

* * * * *